US012040141B2

United States Patent
Lee et al.

(10) Patent No.: US 12,040,141 B2
(45) Date of Patent: Jul. 16, 2024

(54) SWITCH DEVICE

(71) Applicants: Hyundai Motor Company, Seoul (KR); Kia Corporation, Seoul (KR)

(72) Inventors: Jihye Lee, Seoul (KR); Taeseung Kim, Incheon (KR); Dong June Song, Gyeonggi-do (KR); Jin-Woo Kim, Gyeonggi-do (KR); Myung Woock Jeong, Gyeonggi-do (KR); Hee Uoul Ahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/846,083

(22) Filed: Jun. 22, 2022

(65) Prior Publication Data

US 2023/0013698 A1  Jan. 19, 2023

(30) Foreign Application Priority Data

Jul. 15, 2021   (KR) .......................... 10-2021-0092905

(51) Int. Cl.
*H01H 13/02* (2006.01)
*F21V 3/00* (2015.01)
(Continued)

(52) U.S. Cl.
CPC ............. *H01H 13/023* (2013.01); *F21V 3/00* (2013.01); *F21V 7/00* (2013.01); *G06V 40/13* (2022.01);
(Continued)

(58) Field of Classification Search
CPC ... F21W 2111/00; F21V 23/00; F21V 23/003; F21V 23/004; F21V 23/005; F21V 23/007; F21V 23/008; F21V 23/04; F21V 23/0442; F21V 23/0471; F21V 3/00; F21V 7/00; G06V 40/13; H01H 2219/036; H01H 2219/038; H01H 2219/014; H01H 2219/044; H01H 2231/026; H01H 3/14; H01H 35/00; H01H 2207/022; H01H 3/00;
(Continued)

(56) References Cited

U.S. PATENT DOCUMENTS

| 2019/0107095 A1* | 4/2019 | Imai .................... F02N 11/0803 |
| 2020/0269813 A1 | 8/2020 | Mimura |
| 2020/0285596 A1 | 9/2020 | Owaki et al. |

FOREIGN PATENT DOCUMENTS

| JP | 2006-164573 A | 6/2006 |
| JP | 2009-018810 A | 1/2009 |

(Continued)

*Primary Examiner* — Anthony R Jimenez
(74) *Attorney, Agent, or Firm* — Fox Rothschild LLP (57) ABSTRACT

Disclosed is a switch device including a push operation part having a light transmitting portion, a control board installed in a push operation direction of the push operation part, a fingerprint sensor provided on the push operation part to detect a fingerprint of a user pushing the push operation part, a controller provided on one surface of the control board to control the fingerprint sensor, a flexible board provided to electrically connect the fingerprint sensor and the controller, and a plurality of light sources installed on opposite surfaces of the control board and closer to the push operation part than the controller to illuminate the light transmitting portion.

15 Claims, 12 Drawing Sheets

(51) Int. Cl.
*F21V 7/00* (2006.01)
*F21W 111/00* (2018.01)
*G06V 40/13* (2022.01)
*H01H 13/04* (2006.01)
*H01H 13/14* (2006.01)

(52) U.S. Cl.
CPC ............ *H01H 13/04* (2013.01); *H01H 13/14* (2013.01); *F21W 2111/00* (2013.01)

(58) Field of Classification Search
CPC .. H01H 3/02; H01H 3/12; H01H 9/16; H01H 9/18; H01H 9/161; H01H 9/181; H01H 9/182; H01H 13/00; H01H 13/02; H01H 13/023; H01H 13/04; H01H 13/12; H01H 13/14; H01H 13/50; H01H 2003/12
USPC ........................................................ 200/83 R
See application file for complete search history.

(56) References Cited

FOREIGN PATENT DOCUMENTS

| | | |
|---|---|---|
| JP | 2019-071219 A | 5/2019 |
| JP | 2020-004314 A | 1/2020 |
| JP | 2020-009607 A | 1/2020 |

\* cited by examiner

SWITCH DEVICE

CROSS-REFERENCE TO RELATED APPLICATION(S)

This application is based on and claims priority under 35 U.S.C. § 119 to Korean Patent Application No. 10-2021-0092905, filed on Jul. 15, 2021, in the Korean Intellectual Property Office, the disclosure of which is incorporated by reference herein in its entirety.

BACKGROUND

Technical Field

Embodiments of the present disclosure relate to a switch device provided to recognize a fingerprint of a user during a push operation.

Description of the Related Art

Among push-type ignition switches for starting an engine of a vehicle, there is a switch provided to illuminate a light transmitting portion provided in a push operation part using a light source located inside the push operation part to visually inform a user of a state of the engine.

Recently, a push-type ignition switch has been developed that is provided with a fingerprint recognition function as an integral part to perform a user authentication procedure in a process of starting an engine.

However, in the case of the ignition switch provided with the fingerprint recognition function as an integral part, as the number of components installed inside a case of the switch increases, it may be difficult to secure a path for light of the light source to reach the push operation part.

SUMMARY

It is an aspect of embodiments of the present disclosure to provide a switch device capable of preventing a lighting effect of a push operation part from being reduced due to the integration of a configuration for performing a fingerprint recognition function.

Additional aspects of embodiments of the present disclosure will be set forth in part in the description which follows and, in part, will be obvious from the description, or may be learned by practice of embodiments of the present disclosure.

In accordance with an aspect of embodiments of the present disclosure, a switch device includes a push operation part having a light transmitting portion, a control board installed in a push operation direction of the push operation part, a fingerprint sensor provided on the push operation part to detect a fingerprint of a user pushing the push operation part, a controller provided on one surface of the control board to control the fingerprint sensor, a flexible board provided to electrically connect the fingerprint sensor and the controller, and a plurality of light sources installed on opposite surfaces of the control board and closer to the push operation part than the controller to illuminate the light transmitting portion.

The switch device may further be configured to include a diffusion member provided on a rear surface of the push operation part to diffuse the light emitted from the light source.

The switch device may further be configured to include a diffusion member provided on a rear surface of the push operation part to diffuse the light emitted from the light source, and a reflective member provided to reflect the light emitted from the light source toward the diffusion member.

A plurality of the reflective members may be disposed on opposite sides of the opposite surfaces of the control board.

The switch device may further be configured to include a case in which the push operation part is installed at one end thereof in a longitudinal direction, which is the push operation direction, and the control board is fixed in a state of being accommodated therein along the longitudinal direction, wherein the reflective member may be fixed to the case.

The switch device may further be configured to include a switch provided to detect a push operation of the push operation part, and a slider formed in a hollow cylindrical shape with an outer surface slidably supported on an inner surface of the case, and provided to operate the switch by sliding along the longitudinal direction of the case by the push operation part, wherein the reflective member may extend in a direction directing to the light source from the inner surface of the case corresponding to a sliding section of the slider, and a slit provided to prevent the slider from being caught on the reflective member may be formed in the longitudinal direction of the case on the slider at a position corresponding to the reflective member.

The switch device may further be configured to include a switch provided to detect a push operation of the push operation part, and a slider provided to operate the switch by sliding along the push operation direction by the push operation part, wherein the reflective member may be fixed to the slider.

The reflective member may reflect the light emitted from the light source toward the diffusion member in a state in which the slider slides in the push operation direction.

The switch device may further be configured to include a diffusion member provided on a rear surface of the push operation part to diffuse the light emitted from the light source, wherein the diffusion member may include, but is not limited to, a body part, and a light induction part extending to protrude in a direction directing to the light source from a rear surface of the body part.

A plurality of the light induction parts may extend to opposite sides of the opposite surfaces of the control board.

The switch device may further be configured to include a reflective member provided to reflect the light emitted from the light source toward the light induction part.

In accordance with an aspect of embodiments of the present disclosure, a switch device includes a push operation part having a light transmitting portion, a fingerprint sensor provided on the push operation part to detect a fingerprint of a user pushing the push operation part, a controller provided to control the fingerprint sensor, a light source provided to illuminate the light transmitting portion, a control board fixed in a push operation direction of the push operation part and on which the controller and the light source are installed, a flexible board provided to electrically connect the fingerprint sensor and the controller, and a guide provided to limit movement of the flexible board in a direction directing to the light source during a push operation of the push operation part.

The switch device may further be configured to include a case in which the push operation part is installed at one end thereof in a longitudinal direction, which is the push operation direction, and the control board is fixed in a state of being accommodated therein along the longitudinal direction, wherein the guide may be fixed to the case.

The switch device may further be configured to include a switch provided to detect a push operation of the push operation part, and a slider formed in a hollow cylindrical shape with an outer surface slidably supported on an inner surface of the case, and provided to operate the switch by sliding along the longitudinal direction of the case by the push operation part, wherein the guide may extend to protrude between the flexible board and the light source from the inner surface of the case corresponding to a sliding section of the slider, and a slit provided to prevent the slider from being caught on the guide may be formed in the longitudinal direction of the case on the slider at a position corresponding to the guide.

The switch device may further be configured to include a diffusion member provided on a rear surface of the push operation part to diffuse the light emitted from the light source, wherein the guide may be provided between the flexible board and the light source to reflect the light emitted from the light source toward the diffusion member.

BRIEF DESCRIPTION OF THE DRAWINGS

These and/or other aspects of embodiments of the present disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments described below are provided by way of example so that those skilled in the art will be able to fully understand the spirit of the present disclosure. The present disclosure is not limited to the embodiments described below but may be embodied in other forms. In order to clearly explain the present disclosure, parts not related to the description are omitted from the drawings, and the size of the components may be exaggerated for convenience.

A switch device according to an embodiment of the present disclosure may be configured to constitute an ignition switch mounted on a vehicle to start an engine.

As illustrated in FIGS. 1 to 5, the switch device includes a push operation part 20, and the push operation part 20 may be installed at one end of a case 10 of the switch device to enable push operation in a longitudinal direction of the case 10. The push operation part 20 may be provided in the shape of a hollow cylinder with an open lower side.

Figure 1:
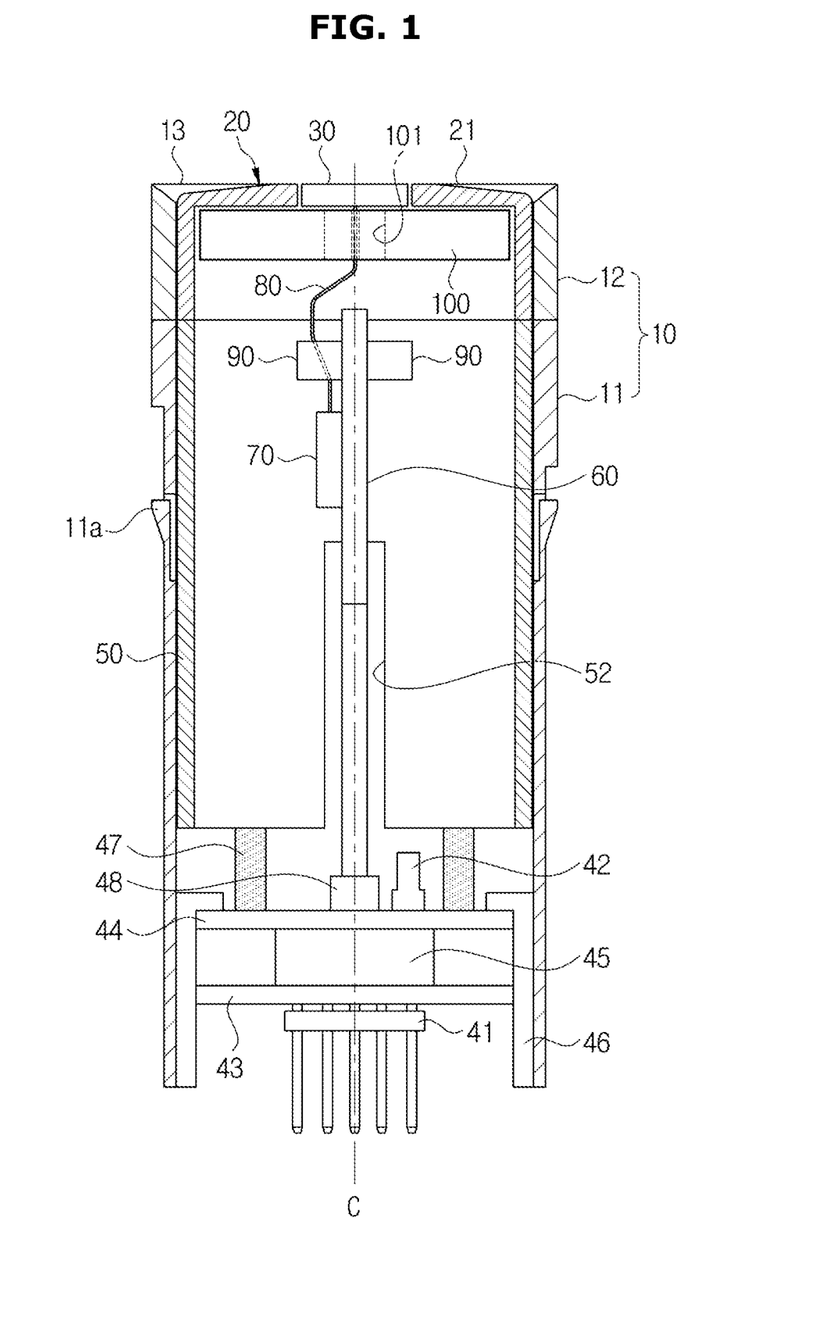
FIG. 1 is a front cross-sectional view of a switch device according to an embodiment of the present disclosure.

The case 10 may be configured to include a case body 11 and a case cover 12 provided at one end of the case body 11. The push operation part 20 may be supported on the case cover 12 to enable push operation in the longitudinal direction of the case 10.

The case 10 may be formed in a hollow cylindrical shape with opposite ends open along the longitudinal direction and a constant inner diameter, and the case body 11 and the case cover 12 may be integrally fixed. Reference mark c in FIG. 1 indicates the central axis of the case 10.

The switch device may be mounted on a vehicle such that the longitudinal direction of the case 10 is vertical. Therefore, a push operation direction of the push operation part 20 may be a vertical direction.

Assembling protrusions 11a for assembling the switch device may be provided on opposite sides of the case body 11. The assembling protrusions 11a may be assembled by being elastically fitted into locking grooves (not shown) provided at positions corresponding thereto. Therefore, the switch device may be assembled by being inserted into installation holes (not shown) having the locking grooves (not shown) by a simple fitting method.

Figure 2:
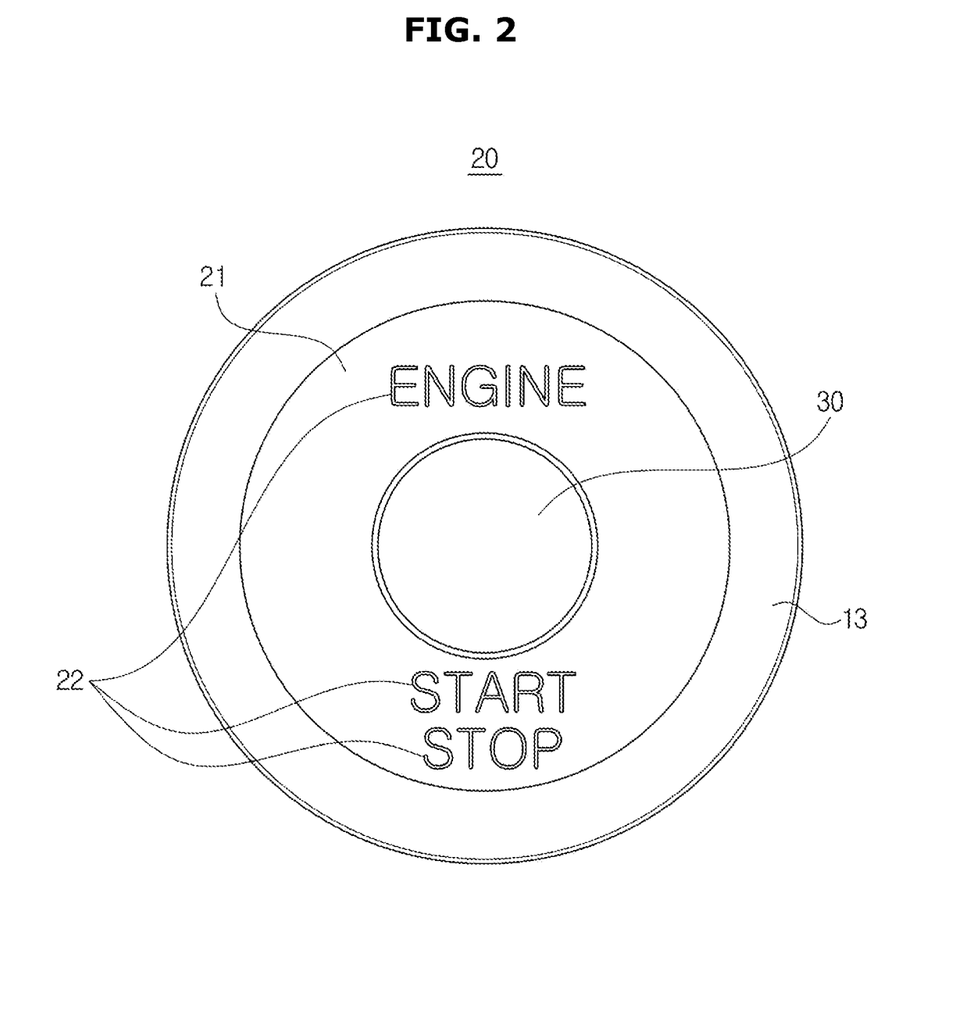
FIG. 2 is a top view of a push operation part of the switch device according to an embodiment of the present disclosure.

A surface of the push operation part 20 exposed to the outside of the case 10 may be configured to form a push operation surface 21 that is pushed by a finger of a user, and a fingerprint sensor 30 for detecting a fingerprint of the user pushing the push operation part 20 may be provided in the center of the push operation surface 21. The fingerprint sensor 30 may be provided to detect a fingerprint in a capacitive or optical manner.

At the other end of the case 10 opposite to the push operation part 20, a connector 41 electrically connected to an external control device (not shown), and a switch 42 provided to detect a push operation of the push operation part 20 may be installed.

The connector 41 and the switch 42 may be mounted through connection boards 43 and 44 installed in a direction orthogonal to the longitudinal direction of the case 10, respectively. The connection boards 43 and 44 may be disposed to be spaced apart from each other in the longitudinal direction of the case 10 and may be connected through the connector 45 between the connection boards 43 and 44.

A fixing frame 46 provided to fix the connection boards 43 and 44 to the case 10 may be interposed between an end of the case 10 and the connection boards 43 and 44.

The switch 42 may be operated by the slider 50 sliding by the push operation of the push operation part 20. A restoring member 47 provided to slide the slider 50 and the push operation part 20, that have slid to turn on the switch 42, to original positions thereof may be installed on the connection board 44. The restoring member 47 may be made of a material having elasticity to provide a restoring force to the slider 50.

A control board 60 may be provided inside between the opposite ends of the case 10, and the control board 60 may be connected to the connection board 44 through a connector 48.

A controller 70 may be provided on the control board 60 to control the fingerprint sensor 30 and the switch 42. The controller 70 may be configured to include a CPU, ROM, RAM, and the like. Fingerprint information of the user of the vehicle may be stored in the ROM of the controller 70, a temporary operation result, etc. may be stored in the RAM.

When the fingerprint sensor 30 detects the fingerprint of the user pushing the push operation part 20, the controller 70 may be configured to compare the fingerprint information detected through the fingerprint sensor 30 with the fingerprint information of the user stored in advance in the vehicle to perform a user authentication procedure. At the same time, the controller 70 may be configured to recognize and determine whether the push operation of the push operation part 20 is present through the switch 42.

Figure 4:
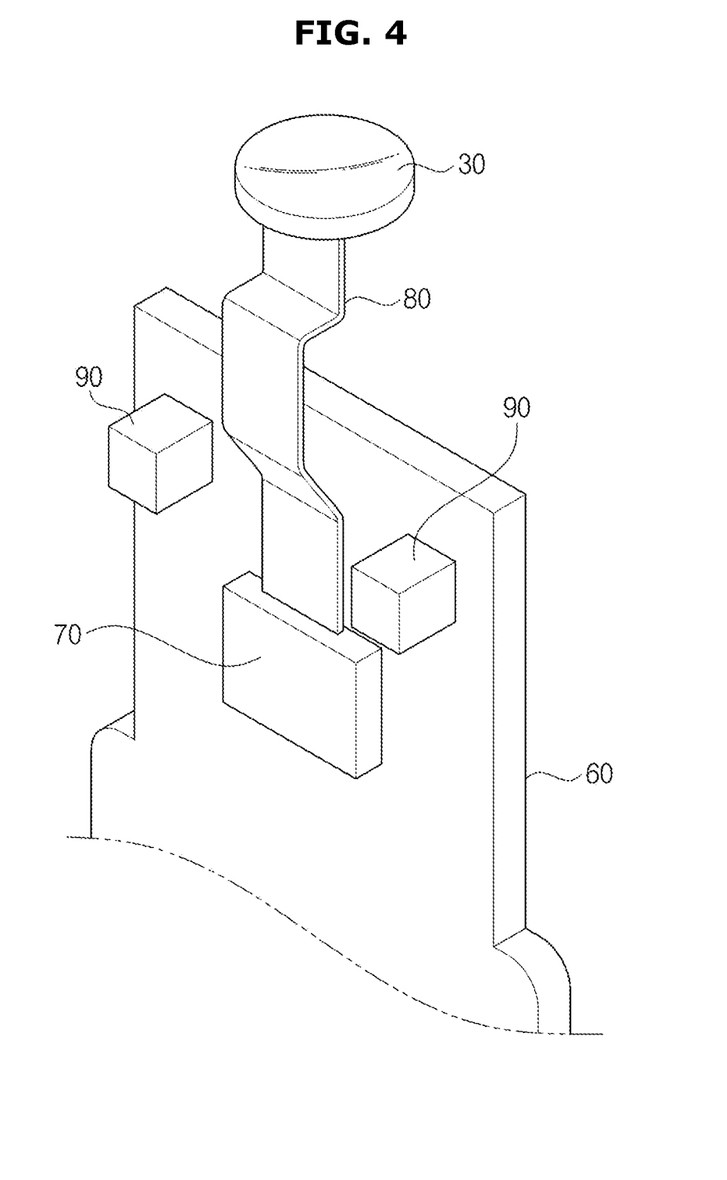
FIG. 4 is a perspective view illustrating a main structure of a fingerprint sensor and substrates of the switch device according to an embodiment of the present disclosure.
Figure 5:
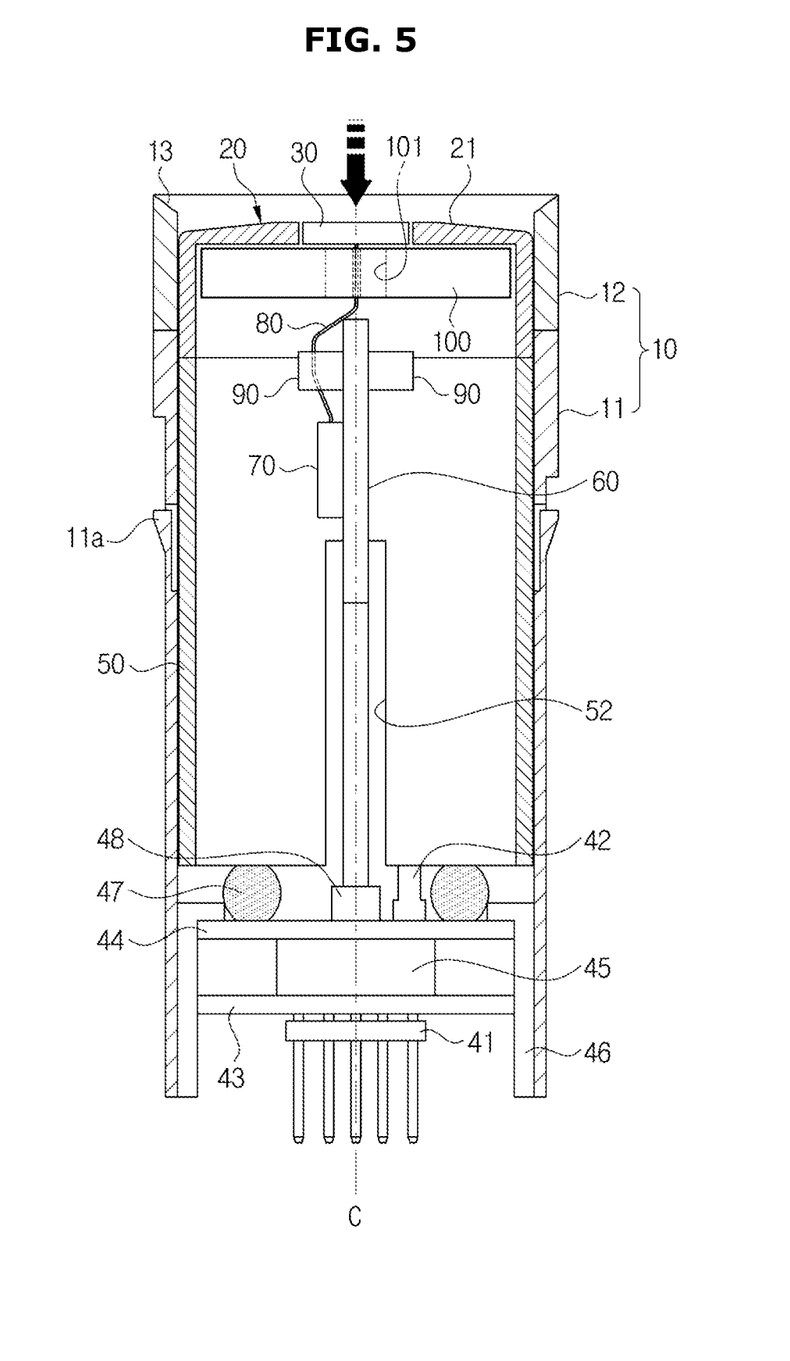
FIG. 5 is a front cross-sectional view of the switch device according to an embodiment of the present disclosure, illustrating an operation process of the switch device.

The fingerprint sensor 30 and the controller 70 may be electrically connected through a flexible board 80 therebetween. The board substrate 80 may be provided as a flexible printed circuit board (FPCB). The flexible board 80 may be configured to apply power required for driving to the fingerprint sensor 30 and transmit a fingerprint information signal detected through the fingerprint sensor 30 to the controller 70.

The flexible board 80 having excellent flexibility may be configured to allow the push operation of the push operation part 20 on which the fingerprint sensor 30 is installed in a state of electrically connecting the controller 70 fixed with respect to the fingerprint sensor 30 and the fingerprint sensor 30.

The slider 50 may be configured to slide along the longitudinal direction of the case 10 by the push operation part 20 to operate the switch 42. The switch 42 may be provided to be turned on in a state of being touched by the slider 50 and turned off in a state of being spaced apart from the slider 50. The switch 42 may be configured to include a fixed contact provided on the connection board 44 and a movable contact provided on the slider 50.

When the fingerprint information of the user pushing the push operation part 20 matches the fingerprint information stored in advance in the vehicle, and the push operation of the push operation part 20 is detected, the controller 70 may be configured to output a vehicle driving signal to the external control device (not shown) through the connector 41 to start the engine.

A driving voltage may be supplied to the controller 70 from a vehicle power source so that the controller 70 may be configured to control the operation of the fingerprint sensor 30 and the switch 42.

The push operation part 20 may be configured to include a light transmitting portion 22, and the switch device may be configured to include a light source 90 installed on the control board 60 to illuminate the light transmitting portion 22. The light source 90 may be provided as an LED.

The light transmitting portion 22 may be configured to emit light through the light source 90 to visually inform the user of a state of the engine. The light transmitting portion 22 may be provided to take a character shape or a specific design shape. In this embodiment, the light transmitting portion 22 may be provided in the form of characters such as 'ENGINE', 'START', and 'STOP', and may be disposed at a circumference of the fingerprint sensor 30.

The rest portion of the push operation part 20 except for the light transmitting portion 22 may be provided to block light so that the lighting effect of the light transmitting portion 22 stands out.

When the push operation part 20 is made of a light-transmitting material as a whole, the rest portion of the push operation part 20 except for the light transmitting portion 22 may be processed to block light transmission, thereby increasing the lighting effect of the light transmitting portion 22.

Figure 3:
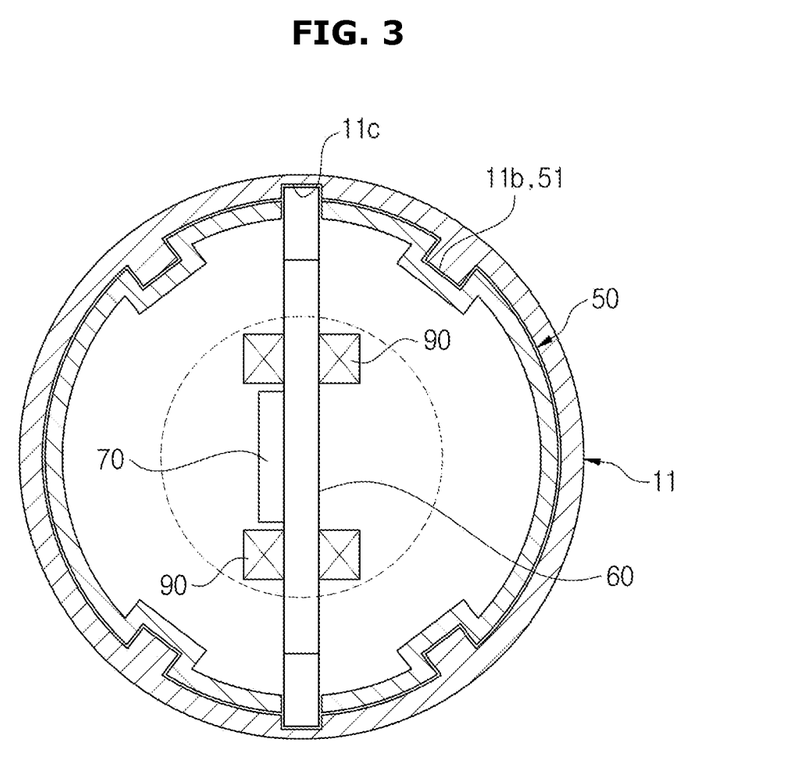
FIG. 3 is a plan cross-sectional view of the switch device according to an embodiment of the present disclosure.

The control board 60 may be installed inside between the opposite ends of the case 10 along the longitudinal direction of the case 10. When viewed from the position of the push operation part 20, the control board 60 may be positioned in a push operation direction of the push operation part 20. When viewed in a state in which the switch device is mounted, the control board 60 may be provided to be vertically erected in a central portion along the longitudinal direction of the case 10, so that an inner space of the central portion of the case 10 may be divided into both sides in a transverse direction.

The control board 60 may be provided for double-sided mounting, and a sufficient mounting space may be secured between opposite surfaces of the control board 60 and an inner wall of the case 10. Such a structure may be configured to act as an advantageous advantage to enable components related to the fingerprint recognition of the user to be integrated with the switch device.

The slider 50 may be configured to have a hollow cylindrical shape with an outer surface slidably supported on an inner surface of the case 10 to effectively operate the switch 42 without degrading the utilization of the inner space of the case 10.

Between the inner surface of the case 10 and the outer surface of the slider 50, a guide protrusion 11b for smoothly guiding the sliding movement of the slider 50, and a guide groove 51 to which the guide protrusion 11b is slidably coupled may be provided with a predetermined length along the longitudinal direction of the case 10. A plurality of the guide protrusions 11b and guide grooves 51 may be provided along a circumference of the case 10.

The control board 60 may be connected to the connector 48 by a lower portion of the control board 60 being coupled to the connector 48 provided on the connection board 44 and may be fixed inside the case 10 in such a way that opposite sides of the lower portion are coupled to the inner surface of the case 10. Coupling grooves 11c to which the opposite sides of the lower portion of the control board 60 are coupled may be provided on the inner surface of the case 10, the slider 50 may be configured to include slits 52 provided at positions corresponding to the coupling grooves 11c to prevent the slider 50 from being caught on the control board 60 in the sliding process.

The controller 70 may be mounted on one surface of the control board 60, and a plurality of the light sources 90 may be installed on the opposite surfaces of the control board 60 at a position closer to the push operation part 20 than the controller 70.

The plurality of light sources 90 may be mounted on the opposite surfaces of an end of the control board 60 opposite to the push operation part 20 to be adjacent to the push operation part 20, and the controller 70 may be positioned lower the light source 90 mounted on one surface of the control board 60.

According to this, by narrowing a distance between the fingerprint sensor 30 provided on the push operation part 20 and the controller 70 so that a length of the flexible board 80 is reduced, the light transmitting portion 22 may be effectively illuminated by the plurality of light sources 90 arranged around the flexible board 80 while reducing an amount of light blocked by the flexible board 80.

The plurality of light sources 90 may be provided on the opposite surfaces of the control board 60, respectively, and the controller 70 may be disposed below between the plurality of light sources 90 disposed on one surface of the control board 60.

A diffusion member 100 for diffusing the light of the light source 90 may be provided on a rear surface of the push operation part 20 to further improve the lighting effect of the light transmitting portion 22.

The light irradiated through the plurality of light sources 90 is transmitted to the light transmitting portion 22 in a state of being evenly dispersed in the diffusion member 100 to enhance the lighting effect of the light transmitting portion 22.

The diffusion member 100 may be coupled to the rear surface of the push operation part 20, and a draw-out hole 101 for drawing out the flexible board 80 may be provided in the center of the diffusion member 100. Therefore, the diffusion member 100 may be formed in a ring shape having the draw-out hole 101 in the center.

Figure 6:
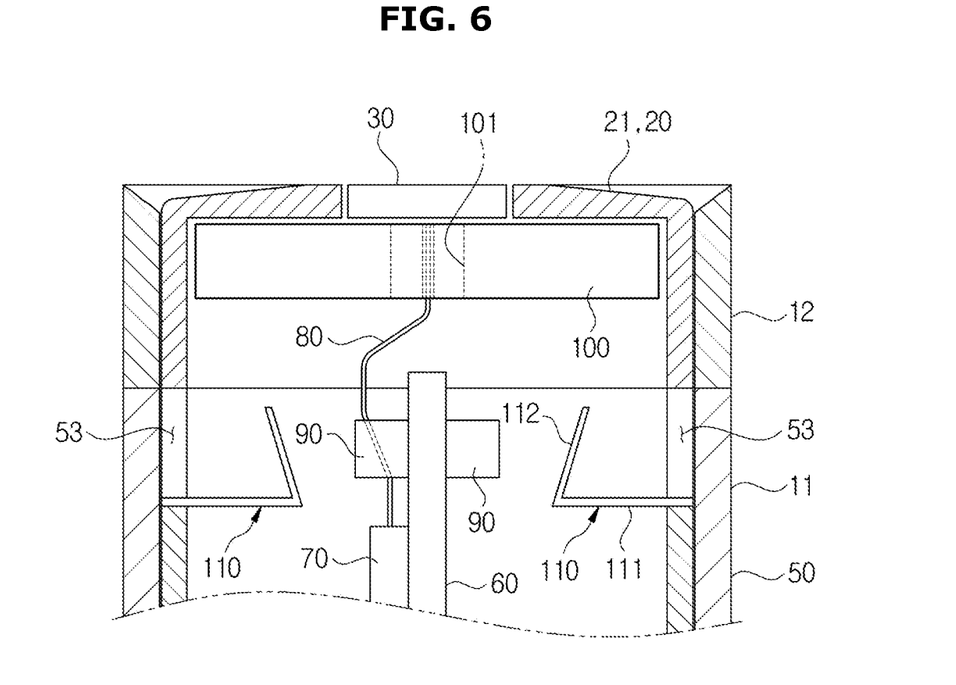
FIG. 6 is a partial front cross-sectional view of a modified example of the switch device according to an embodiment of the present disclosure.
Figure 7:
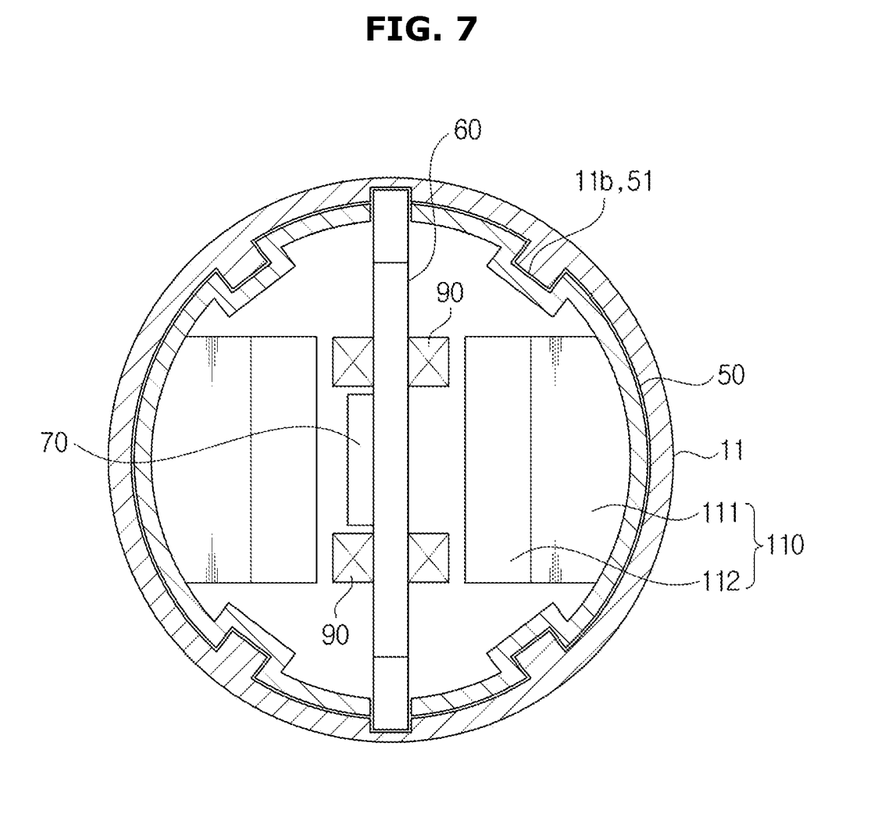
FIG. 7 is a plan cross-sectional view of FIG. 6.

As illustrated in FIGS. 6 and 7, the switch device may further be configured to include a reflective member 110 provided to reflect the light emitted from the light source 90 toward the diffusion in ember 100.

The reflective member 110 is disposed between the diffusion member 100 and the light source 90 to reflect the light emitted from the light source 90 toward the diffusion member 100, so that light loss between the light source 90 and the diffusion member 100 may be reduced.

A plurality of the reflective members 110 may be disposed on opposite sides of opposite surfaces of the control board 60 to correspond to an arrangement structure of the light sources 90 disposed on the opposite surfaces of the control board 60.

The reflective member 110 may be configured to include a fixing part 111 fixed to the case 10 and a reflective part 112 extending from the fixing part 111.

The reflective part 112 may be provided to be inclined on a side of the light source 90 to reflect the light emitted from the light source 90 toward the diffusion member 100 thereon.

The reflective member 110 may be fixed to the inner surface of the case 10 corresponding to a sliding section of the slider 50. Therefore, there may be no gap between the slider 50 and the reflective member 110 in the longitudinal direction of the case 10.

On the slider 50 at a position corresponding to the reflective member 110, a slit 53 for preventing the slider 50 from being caught on the reflective member 110 during sliding may be formed in the longitudinal direction of the case 10.

Figure 8:
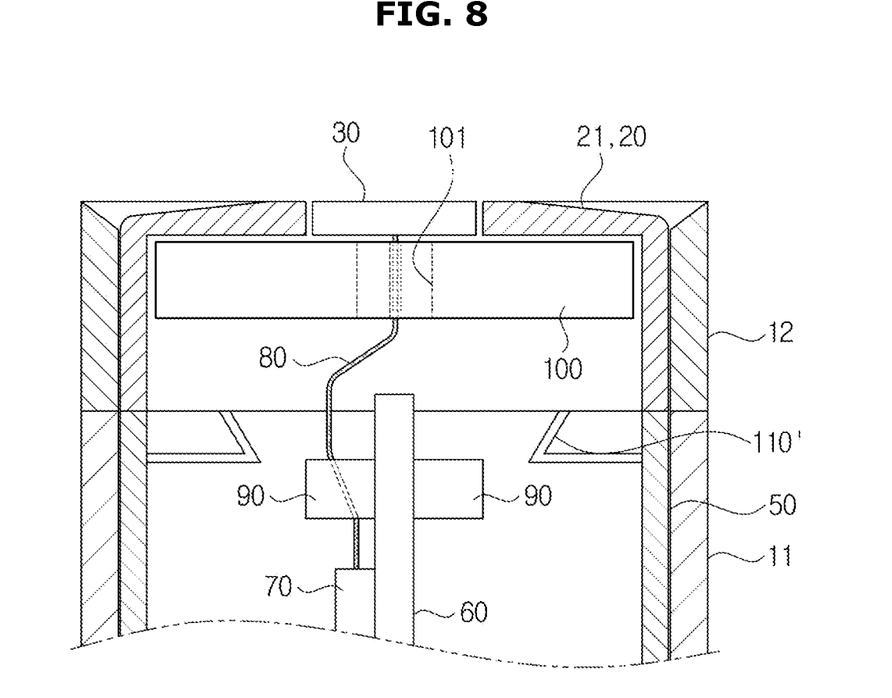
FIG. 8 is a partial front cross-sectional view of another modified example of the switch device according to an embodiment of the present disclosure.
Figure 9:
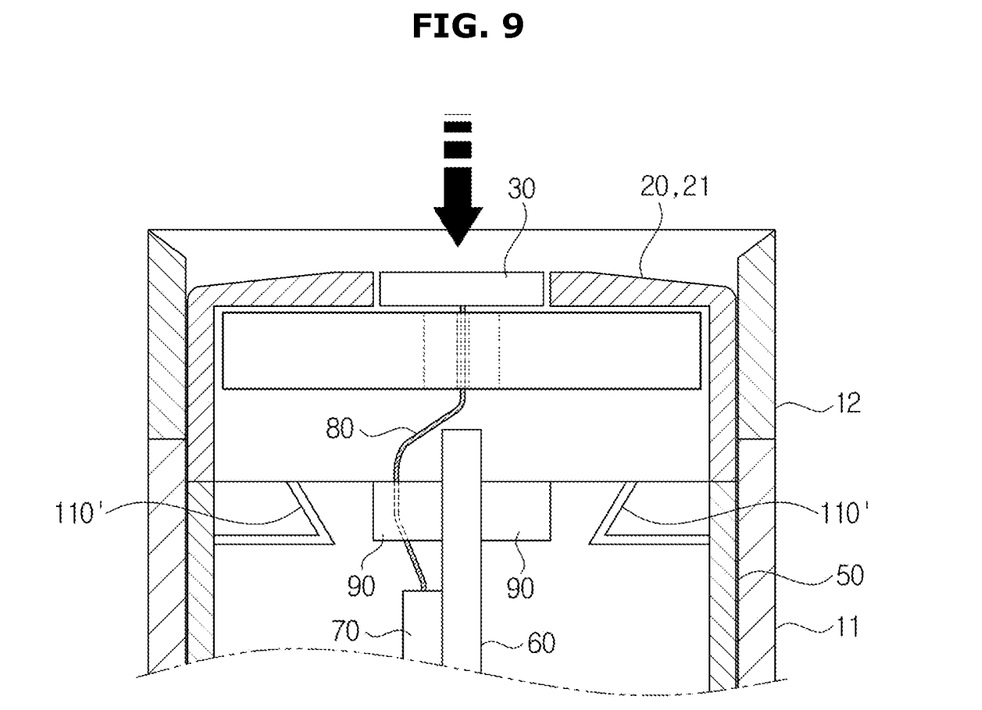
FIG. 9 illustrates an operation process of the switch device of FIG. 8.

As illustrated in FIGS. 8 and 9, a reflective member 110' may be provided to be fixed to the slider 50. The reflective member 110' may also be provided to move to a position where the light emitted from the light source 90 may be reflected toward the diffusion member 100 by the reflective member 110' in a state in which the slider 50 slides in the push operation direction of the push operation part 20. Accordingly, the reflective member 110' does not need to be formed to extend long in the longitudinal direction of the case 10 in consideration of a sliding distance of the slider 50.

Figure 10:
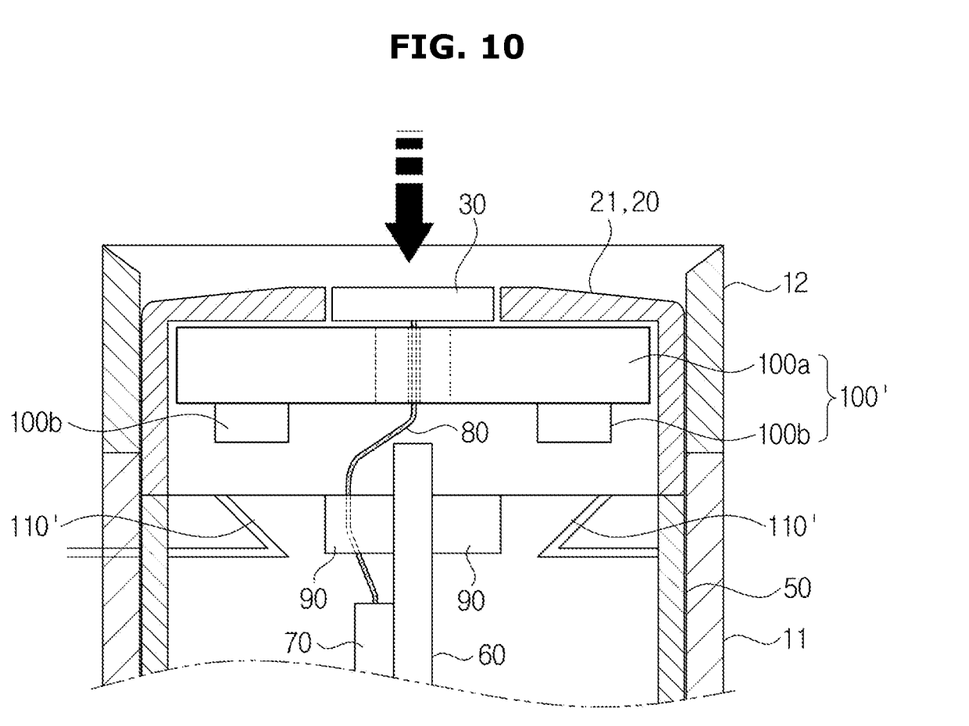
FIG. 10 is a partial front cross-sectional view of another modified example of the switch device according to an embodiment of the present disclosure, illustrating an operation process of the switch device.

As illustrated in FIG. 10, the diffusion member 100' may be configured to include a body part 100a disposed on the rear surface of the push operation part 20, and a light induction part 100b extending to protrude from the rear surface of the body part 100a to a direction directing to the light source 90.

The light induction part 100b is to further improve the lighting effect of the light transmitting portion 22 by the light source 90 and may be configured to exert the effect of disposing the diffusion member 100' closer to the light source 90 without limiting the sliding operation of the push operation part 20.

Corresponding to the arrangement structure of the light sources 90 disposed on the opposite surfaces of the control board 60, a plurality of the light guiding parts 100b may be configured to extend from a rear surface of the body part 100a to the opposite sides of the opposite surfaces of the control board 60. A pair of the light induction parts 100b may be provided to correspond to the opposite sides of the control board 60, or a plurality of the light induction parts 100b corresponding to the number of light sources 90 may be provided.

The reflective member 110 for reflecting the light emitted from the light source 90 to the light induction part 100b is provided between the light source 90 and the light induction part 100b, so that light loss between the light source 90 and the light induction part 100*b* may be reduced. The reflective member 110' may be installed through the slider 50 as in the above-described structure.

Figure 11:
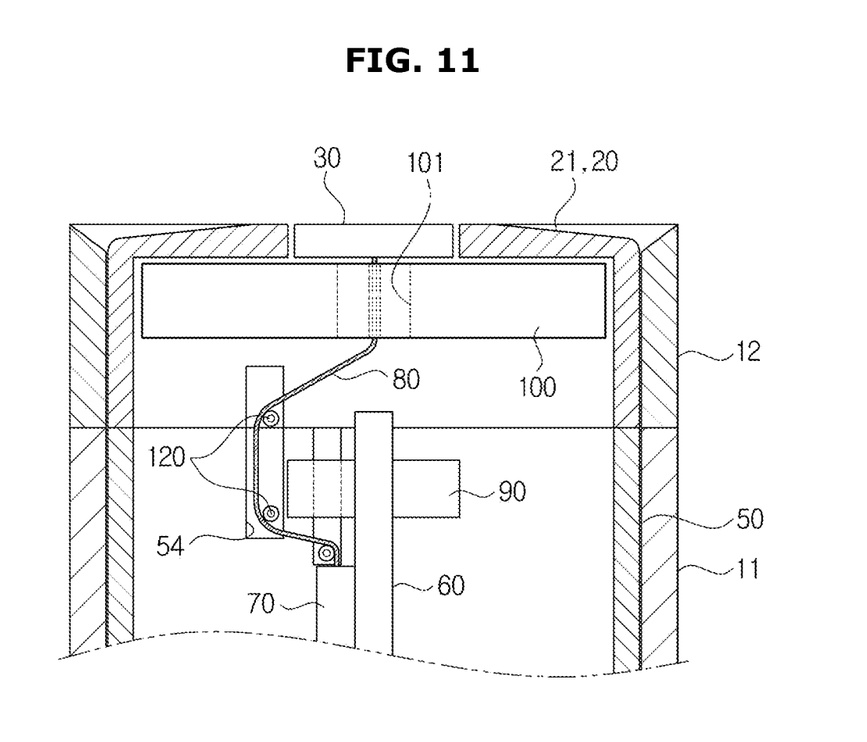
FIG. 11 is a partial front cross-sectional view of another modified example of the switch device according to an embodiment of the present disclosure.
Figure 12:
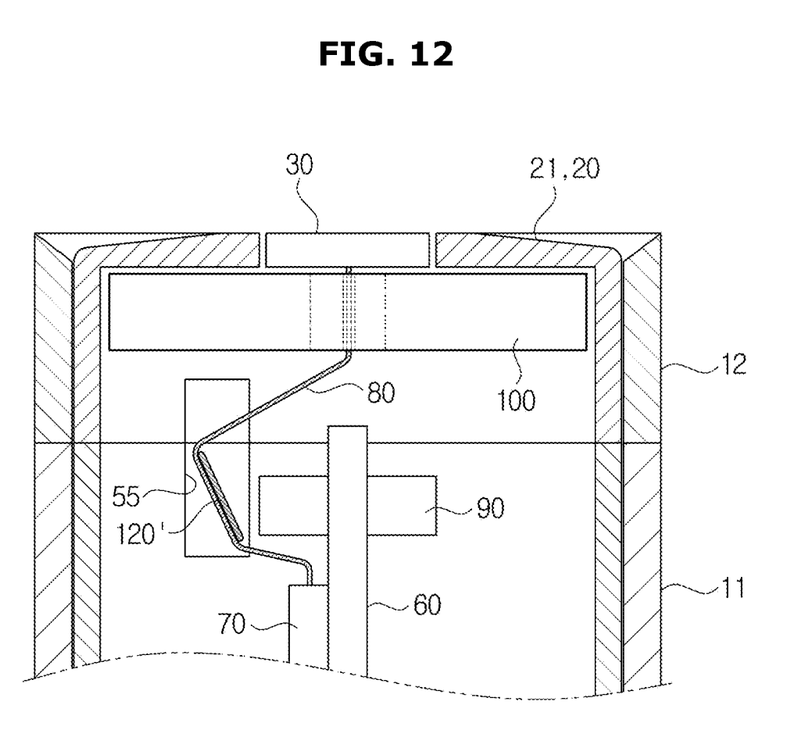
FIG. 12 is a partial front cross-sectional view of another modified example of the switch device according to an embodiment of the present disclosure.

As illustrated in FIGS. 11 and 12, the switch device may be configured to include a guide 120 provided to limit movement of the flexible board 80 in the direction directing to the light source 90 during the push operation of the push operation part 20.

The guide 120 may be configured to limit invasion of the flexible board 80 toward the light source 90 in the push operation process of the push operation part 20, so that light interference caused by the flexible board 80 may be suppressed.

The guide 120 may be provided in the form of a protrusion protruding between the flexible board 80 and the light source 90 from the inner surface of the case 10 and may be fixed to the case 10.

A plurality of the guides 120 may be provided to limit movement of a plurality of points of the flexible board 80 toward the light sources 90.

At least a portion of the plurality of guides 120 may be configured to extend to protrude between the flexible board 80 and the light source 90 from the inner surface of the case 10 corresponding to the sliding section of the slider 50, and a slit 54 for preventing the slider 50 from being caught on the guide 120 may be formed on the slider 50 at a position corresponding to the guide 120 in the longitudinal direction of the case 10. When some of the guides 120 are positioned toward the push operation part 20, a slit corresponding to the slit 54 may be provided on the push operation part 20 as well.

As illustrated in FIG. 12, a guide 120' may be provided between the flexible board 80 and the light source 90 to serve as a light reflection function to reflect the light emitted from the light source 90 toward the diffusion member 100, and a slit 55 for preventing the slider 50 from being caught on the guide 120' may be formed on the slider 50 at a position corresponding to the guide 120' in the longitudinal direction of the case 10. When the guide 120' is positioned toward the push operation part 20, a slit corresponding to the slit 55 may be provided on the push operation part 20 as well.

The guide 120 may be provided in the form of an inclined plate to reflect the light emitted from the light source 90 toward the diffusion member 100 through one surface thereof facing the light source 90 and may be configured to block the flexible board 80 from moving in the direction of the light source 90 through the opposite surface.

In this case, an arrangement structure of the light sources 90 may be the same as the arrangement structure described above. Even if the arrangement structure of the light sources 90 is changed, the lighting effect of the light transmitting portion 22 improved by the guide 120' may be effective.

As is apparent from the above, according to the switch device according to an embodiment of the present disclosure, as an arrangement structure of components is optimized together with the configuration for performing a fingerprint recognition function, reduction of a lighting effect of a push operation part due to the integration of the configuration for performing the fingerprint recognition function can be prevented.

Hereinabove, although the present disclosure has been described with reference to exemplary embodiments and the accompanying drawings, the present disclosure is not limited thereto but may be variously modified and altered by those skilled in the art to which the present disclosure pertains without departing from the spirit and scope of the present disclosure claimed in the following claims. Therefore, embodiments of the present invention are not intended to limit the technical spirit of the present invention but provided only for the illustrative purpose. The scope of the present disclosure should be construed on the basis of the accompanying claims, and all the technical ideas within the scope equivalent to the claims should be included in the scope of the present disclosure.

What is claimed is:

1. A switch device comprising:
   a push operation member having a light transmitting portion;
   a control board installed in a push operation direction of the push operation member;
   a fingerprint sensor provided on the push operation member to detect a fingerprint of a user pushing the push operation member;
   a controller provided on one surface of the control board to control the fingerprint sensor;
   a flexible board provided to electrically connect the fingerprint sensor and the controller; and
   a plurality of light sources installed on opposite surfaces of the control board and closer to the push operation member than the controller relative to the push operation member to illuminate the light transmitting portion.

2. The switch device according to claim 1, further comprising:
   a diffusion member provided on a rear surface of the push operation member to diffuse light emitted from the light sources.

3. The switch device according to claim 2, further comprising:
   a reflective member provided to reflect the light emitted from the light sources toward the diffusion member.

4. The switch device according to claim 3, wherein a plurality of the reflective members is disposed on opposite sides of the opposite surfaces of the control board.

5. The switch device according to claim 3, further comprising:
   a case in which the push operation member is installed at one end thereof in a longitudinal direction, which is the push operation direction, and the control board is fixed in a state of being accommodated therein along the longitudinal direction,
   wherein the reflective member is fixed to the case.

6. The switch device according to claim 5, further comprising:
   a switch provided to detect a push operation of the push operation member; and
   a slider formed in a hollow cylindrical shape with an outer surface slidably supported on an inner surface of the case, and provided to operate the switch by sliding along the longitudinal direction of the case by the push operation member,
   wherein the reflective member is configured to extend in a direction towards the light sources from the inner surface of the case corresponding to a sliding section of the slider, and
   wherein a slit provided to prevent the slider from being caught on the reflective member is formed in the longitudinal direction of the case on the slider at a position corresponding to the reflective member.

7. The switch device according to claim 3, further comprising:
   a switch provided to detect a push operation of the push operation member; and a slider provided to operate the switch by sliding along the push operation direction by the push operation member, wherein the reflective member is fixed to the slider.

8. The switch device according to claim 7, wherein the reflective member is configured to reflect the light emitted from the light sources toward the diffusion member in a state in which the slider slides in the push operation direction.

9. The switch device according to claim 1, further comprising:

a diffusion member provided on a rear surface of the push operation member to diffuse the light emitted from the light sources, wherein the diffusion member comprises a body part, and a light induction part extending to protrude in a direction towards the light sources from a rear surface of the body part.

10. The switch device according to claim 9, wherein a plurality of the light induction parts is configured to extend to opposite sides of the opposite surfaces of the control board.

11. The switch device according to claim 9, further comprising:

a reflective member provided to reflect the light emitted from the light sources toward the light induction part.

12. A switch device comprising:

a push operation member having a light transmitting portion;

a fingerprint sensor provided on the push operation member to detect a fingerprint of a user pushing the push operation member;

a controller provided to control the fingerprint sensor;

a light source provided to illuminate the light transmitting portion;

a control board fixed in a push operation direction of the push operation member and on which the controller and the light source are installed;

a flexible board provided to electrically connect the fingerprint sensor and the controller; and a guide provided to limit movement of the flexible board in a direction towards the light source during a push operation of the push operation member.

13. The switch device according to claim 12, further comprising:

a diffusion member provided on a rear surface of the push operation member to diffuse light emitted from the light source, wherein the guide is provided between the flexible board and the light source to reflect the light emitted from the light source toward the diffusion member.

14. The switch device according to claim 12, further comprising:

a case in which the push operation member is installed at one end thereof in a longitudinal direction, which is the push operation direction, and the control board is fixed in a state of being accommodated therein along the longitudinal direction, wherein the guide is fixed to the case.

15. The switch device according to claim 14, further comprising:

a switch provided to detect a push operation of the push operation member; and a slider formed in a hollow cylindrical shape with an outer surface slidably supported on an inner surface of the case, and provided to operate the switch by sliding along the longitudinal direction of the case by the push operation member, wherein the guide is configured to extend to protrude between the flexible board and the light source from the inner surface of the case corresponding to a sliding section of the slider, and wherein a slit provided to prevent the slider from being caught on the guide is formed in the longitudinal direction of the case on the slider at a position corresponding to the guide.

* * * * *